Figure 1:
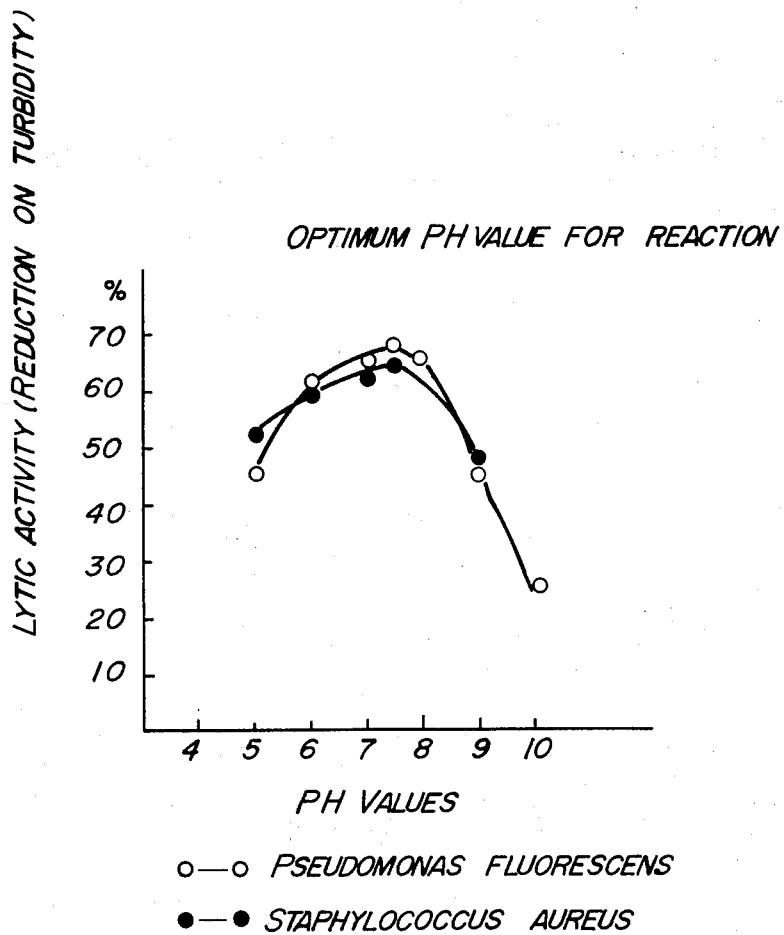

United States Patent [19]

Sugiyama

[11] 3,816,260

[45] June 11, 1974

[54] BACTERIAL CELLWALL LYTIC ENZYME AND PROCESS FOR PRODUCING THE SAME

[75] Inventor: Shinichi Sugiyama, Nagareyama, Japan

[73] Assignee: Kikkoman Shoya Co., Ltd., Noda-shi, Japan

[22] Filed: Mar. 28, 1972

[21] Appl. No.: 238,768

[30] Foreign Application Priority Data
Mar. 29, 1971 Japan.............................. 46-17889

[52] U.S. Cl. .............................. 195/62, 195/66 R
[51] Int. Cl............................................ C12d 13/10
[58] Field of Search........................... 195/62, 65, 66

[56] References Cited
UNITED STATES PATENTS
3,390,054  6/1968  Morihara .......................... 195/66 R OTHER PUBLICATIONS
Repaske, Biochimica Biophysica Acta Vol. 22 pages 189-191 (1956)

Primary Examiner—Lionel M. Shapiro
Attorney, Agent, or Firm—Cushman, Darby & Cushman

[57] ABSTRACT

A bacterial cellwall lytic enzyme having an ability to dissolve bacterial cellwalls; an optimum pH of 7.0 to 8.0, an optimum temperature of 37° to 40° C and a heat stability being lost at 60° C for 30 minutes for gram-positive bacteria of the genera *Staphylococcus, Micrococcus, Bacillus, Corynebacterium* and Lactobacillus; an optimum pH of 7.0 to 8.0, an optimum temperature of 40° to 45° C and a heat stability being kept 80 percent at 60° C for 30 minutes for gram-negative bacteria of the genera *Psudomonas, Proteus, Erwinia, Arthrobacter, Achromobacter, Escherichia, Aeromonas* and *Xanthomonas;* and a residual activity being 45.8 percent in a 10 percent, sodium chloride solution, is produced by cultivating a microorganism belonging to the genus *Pseudomonas* and being capable of producing the bacterial cellwall lytic enzyme from a non-carbohydrate carbon source, for example, hydrocarbons, alcohols, and organic acids, for example, *Pseudomonas aeruginosa* L-1028, FERM-P 788, ATCC 21776, in a medium containing 1 to 5 percent (W/V) of at least one of the non-carbohydrates under aerobic conditions, forming and accumulating the enzyme in the medium, and recovering the enzyme from the medium. The enzyme is useful for medicine, agricultural chemicals and protection from bacterial infection on foods or animal feeds.

8 Claims, 3 Drawing Figures

BACTERIAL CELLWALL LYTIC ENZYME AND PROCESS FOR PRODUCING THE SAME

This invention relates to a process for producing a bacterial cellwall lytic enzyme, and more particularly to a process for recovering a bacterial cellwall lytic enzyme by cultivating a microorganism in a medium containing non-carbohydrate such as hydrocarbons, alcohols, organic acids, etc. as a carbon source thereby to produce and accumulate a large amount of the bacterial cellwall lytic enzyme in the medium, and recovering the enzyme from the culture broth.

An object of the present invention is to provide a process for producing bacterial cellwall lytic enzyme from the cheap non-carbohydrate source such as the petroleum source, etc. in an industrial scale.

Heretofore, it has been known that the bacterial cellwall lytic enzyme is produced from a sugar material as a carbon source by actinomycetes such as *Streptomyces griseobilens* (Japanese Patent Publication No. 5190/67), or bacteria of the genus Flavobacterium [Biken Journal 2 211 (1959)], etc., and lysozyme separated from albumin. However, there has been not known yet such an example that the bacterial cellwall lytic enzyme can be produced by cultivating a microorganism in a medium containing a non-carbohydrate such as petroleum, or its fractions, hydrocarbons, or alcohols or organic acids, as a carbon source.

The present inventor has made screening of microorganisms capable of producing bacterial cellwall lytic enzyme from the non-carbohydrate carbon sources widely from the viewpoint of the development of new resources, and as a result has found that a microorganism belonging to the genus *Pseudomonas* can produce such an enzyme from the non-carbohydrate carbon source. The microorganism was newly isolated from the soil in Chiba prefecture, Japan.

The microbiological properties of the microorganism are given as follows:

1. Morphological properties

Rods, 0.5 to 0.6 by 1.3 – 1.5 $\mu$, occurring singly. Non-polymorphic Motile, possessing mostly one polar flagella. Gram — negative 2. Growth state in various media 1. Bouillon agar colonies: circular, smooth, translucent.
2. Bouillon agar slant: well grown, spreading, becoming transparent. The medium turning slightly green.
3. Peptone water: well grown, turbid, forming membranes on the surface. Precipitates cloudy. The medium turning green.
4. Gelatin stab: linearly grown. Liquefaction takes place in a funnel state. Rapid liquefaction.
5. Normal paraffin slant: medium growth. The medium turning greenish brown.
6. Litmus milk: a soft coagulum is formed with rapid peptonization, Reduction Litmus, reaction alkaline.
7. Potato: grown well, turning dark brown.
8. Growth temperature: 20° – 45° C, and readily grown at 45° C.
9. Optimum temperature: 37° C.

3. Physiological properties:

1. Nitrates reduction: positive at the third day (positive on succinic acid medium)
2. Indole formation: negative
3. Glucose: oxidatively assimilated
4. V.P. test: negative
5. Pigment production: vivid green phosphorescent pigments are formed on Visinski medium.

When the foregoing results were compared with the description of Bergey's Manual of Determinative Bacteriology, 7th edition (1957), the microorganism was identified to be a strain belonging to *Pseudomonas aeruginosa*, and named *Pseudomonas aeruginosa* L-1028.

The strain was deposited with the accession number FERM-P 788 in Fermentation Research Institute, Agency of Industrial Science & Technology, No. 8-1 Inage, Higashi-5-chome, Chiba-shi, Chiba-ken, Japan, and also with accession number ATCC No. 21776 in American Type Culture Collection, 12301 Parklawn Drive, Rockville, Md., USA.

The present invention has been accomplished on the basis of the foregoing finding, and provides a process for producing a bacterial cellwall lytic enzyme which comprises cultivating a microorganism belonging to the genus *Pseudomonas* and being capable of producing a bacterial cellwall lytic enzyme from a non-carbohydrate such as hydrocarbons, alcohols, and organic acids as a carbon source, in a medium containing at least one of the non-carbohydrates selected from hydrocarbons, alcohols, organic acids and ammonium or sodium salts of said organic acids as a main carbon source thereby to form and accumulate the bacterial cellwall lytic enzyme, and recovering the enzyme from the resulting culture broth.

Not only said *Pseudomonas aeruginosa* L-1028 (FERM-P 788; ATCC No. 21776), but also any other microorganism can be used in the present invention, so far as the microorganism belongs to the genus *Pseudomonas* and is capable of producing the bacterial cellwall lytic enzyme when cultivated in a medium containing a non-carbohydrate such as hydrocarbons, alcohols and organic acids as a main carbon source.

As the hydrocarbons used as the carbon source for the medium when the microorganism is cultivated according to the present invention, petroleum, or its hydrocarbon factions, for example, kerosene, gas oil, liquid paraffin, particularly such aliphatic hydrocarbons as n-paraffins of $C_{12} - C_{18}$ can be used. As the alcohols, ethyl alcohol, methyl alcohol, etc. can be used. As the organic acid, acetic acid, succinic acid, etc. can be used.

As a nitrogen source, the nitrogen source usually for the cultivation of microorganism, such as urea, ammonium salts, nitrates, etc. can be used.

As inorganic salts, various inorganic salts such as potassium phosphate, magnesium nitrate, sodium phosphate, etc. can be used. In addition, metal ions such as iron ion, cobalt ion, etc., vitamins, and other trace elements can be added to the medium, if necessary. The medium is prepared to take a pH of about 7.0 to 8.0 after sterilization, and then sterilized.

It is preferable to use 1 – 5 percent (W/V) of at least one of non-carbohydrates selected from hydrocarbons, alcohols and organic acids as the carbon source, on the basis of the volume of the medium. Since the hydrocarbons are not soluble in water almost at all, the hydrocarbons must be vigorously stirred together with the aqueous solution of medium thereby to form a finely dispersed suspension, or a suitable suspending agent or dissolving agent must be added to the medium, when the hydrocarbons are added to the liquid medium.

After the sterilization of the medium, a seed culture obtained by cultivating the microorganism in another medium having the same composition in advance is inoculated into the sterilized medium, and subjected to cultivation. It is preferable to carry out the cultivation at 20° to 40° C for 24 to 96 hours by aeration-stirring or by shaking. The most preferable time for finishing the cultivation is such that the growth of the microorganism reaches the stationary period and the optical density (O.D.) of the culture broth starts to decrease.

After the completion of cultivation, a supernatant solution is obtained by removing cells of microorganisms from the culture broth by a suitable means, for example, centrifuge, etc. The desired bacterial cellwall lytic enzyme is contained in the supernatant solution.

Lytic spectrum of the supernatant solution thus obtained towards various living bacteria is shown in Table 1. The lytic spectrum was obtained in the following test manner. The various bacteria for the test were each cultivated in nutrient broths in advance, and collected by contrifuge and washed twice with distilled water and further twice with 0.1 M tris buffer solution (pH 7.6). Then, the cells of bacteria were suspended in said buffer solution, and the cell concentration of suspensions were adjusted so that the 10-fold diluted suspensions might take O.D. of 0.5 – 0.6 at 660 mμ. For each strain, 5 ml of the suspension thus prepared was each poured into two test tubes, and 1 ml of the supernatant solution obtained from the culture broth of *Pseudomonas aeruginosa* L-1028 (FERM-P 788; ATCC No. 21776) was added to one of the two test tubes, and 1 ml of distilled water was added to other test tube. Reaction was carried out at 30° – 45° C for one hour and four hour, and the bacteriolytic activity was determined from the reduction in O.D. at 660 mμ after the respective reaction time. The bacteolytic activity is represented by percent according to the following formula:

Bacteriolytic activity (percent) = $A - B/C \times 100$ wherein A, B and C have the following meanings:
A: Reduction in O.D. of the reaction solution
B: Reduction in O.D. of the distilled water-added system. This is the reduction in O.D. due to autodigestion of the test bacteria during the reaction time.
C: O.D. value of the reaction solution at zero hour. This is the O.D. value right after said supernatnat solution is added to the suspension of the test bacteria.

TABLE 1

Lytic spectrum towards gram-positive bacteria

| | |
|---|---|
| *Staphylococcus aureus* IAM 1098 | 89.8 |
| *Staphylococcus aureus* IAO 3180 | 85.0 |
| *Micrococcus lysodeikticus* IAM 1056, ATCC 4698 | 2.9 |
| *Micrococcus ureae* ATCC 14375 | 45.0 |
| *Micrococcus caseolyticus* IAM 1312 | 54.25 |
| *Micrococcus rubens* IAM 1315 | 3.4 |
| *Bacillus subtilis* IAM 1069 | 56.8 |
| *Bacillus cereus* | 23.4 |
| *Bacillus megatherium* IAM 1030 | 7.6 |
| *Conynebacterium equi* IAM 1038 | 1.4 |
| *Lactobacillus acidophilus* ATCC 11506 | 14.7 |
| *Lactobacillus homohiochi* RIBS-24 | 13.5 |
| *Lactobacillus heterohiochii* ATCC 15435 | 14.1 |
| *Lactobacillus plantarum* ATCC 8014 | 6.3 |
| *Lactobacillus casei* ATCC 7469 | 17.8 |

Lytic spectrum towards Gram-negative bacteria

| | |
|---|---|
| *Pseudomonas fluorescens* IAM 1179 | 75.2 |
| *Pseudomonas skylkilineis* IAM 1154 | 66.6 |
| *Pseudomonas convexa* ATCC 795 | 72.5 |
| *Pseudomonas ovalis* IAM 1002 | 59.8 |
| *Pseudomonas fragi* IFO 3458 | 58.6 |
| *Pseudomonas testostroni* ATCC 11996 | 50.2 |
| *Pseudomonas aeruginosa* ATCC 14886 | 72.5 |
| *Proteus vulgaris* IAM 1025 | 42.2 |
| *Erwinia carotovord* IFO 3380 | 68.2 |
| *Arthrobacter ureafaciens* IAM 1658 | 52.2 |
| *Achromobacter cycloclastes* ATCC 15446 | 36.2 |
| *Aeromonas liquefaciens* AHU 1346 | 71.9 |
| *Xanthomonas oryzae* | 15.4 |
| *Pseudomonas tabaci* ATCC 11527 | 42.2 |
| *Xanthomonas citri* | 20.2 |

As shown in Table 1, the supernatant solution has a bacteriolytic effect upon such gram-negative bacteria as those of the genus *Pseudomonas*, *Proteus*, *Enwinia*, *Arthrobacter*, *Achromobacter*, such gram-positive bacteria as those of the genera *Micrococcus*, *Staphylococcus*, etc., and the bacteria of the genera *Achromobacter*, *Bacillus*, *Lactobacillus*, etc.

To isolate crude enzyme from the supernatant solution containing said bacterial cellwall lytic enzyme thus obtained according to the present invention, the supernatant solution is subjected to salting-out with ammonium sulfate, sodium chloride, sodium sulfate, etc., or the bacterial cellwall lytic enzyme is fractionally precipitated from the super-natant solution according to the conventional method, using alcohols. Further, the enzyme can be isolated by such means generally utilized as a protein-isolating method, as gel filtration, chromatrography, etc. The crude enzyme thus obtained is further purified by the well-known means known as a enzyme purification method.

The pH range where the present bacterial cellwall lytic enzyme has a lytic activity is 6.0 to 8.0. The determination was carried out in the following manner:

Acetone-dried cells of microorganism serving as a substrate were suspended in 5 ml of various buffer solutions so that the cells might take 0.6 percent (W/V), and an alcohol precipitate of a supernatant solution obtained by cultivating *Pseudomonas aeruginosa* L-1028 (FERM-P 788, ATCC No. 21776) in a n-paraffin-containing medium was added as an enzyme source to the resulting suspension. The bacterio-lytic activity at various values of pH was measured. As the microorganisms serving as the substrate, *Staphylococcus aureus* IAM 1098 was used as the gram-positive strain, and *Pseudomonas fluorescens* IAM 1179 was used as the gram-negative strain.

The enzyme solution was prepared from said alcohol precipitation powders so that the solution might contain 0.01 percent (W/V) enzyme, and 1 ml of the enzyme solution was added to 5 ml of the microorganism suspension. Reaction was carried out at 40° C for 1 hour, and then the bacteriolytic activity was measured. The result is shown in FIG. 1, where the optimum pH for these two bacteria is from about 6.0 to about 8.0.

Figure 2:
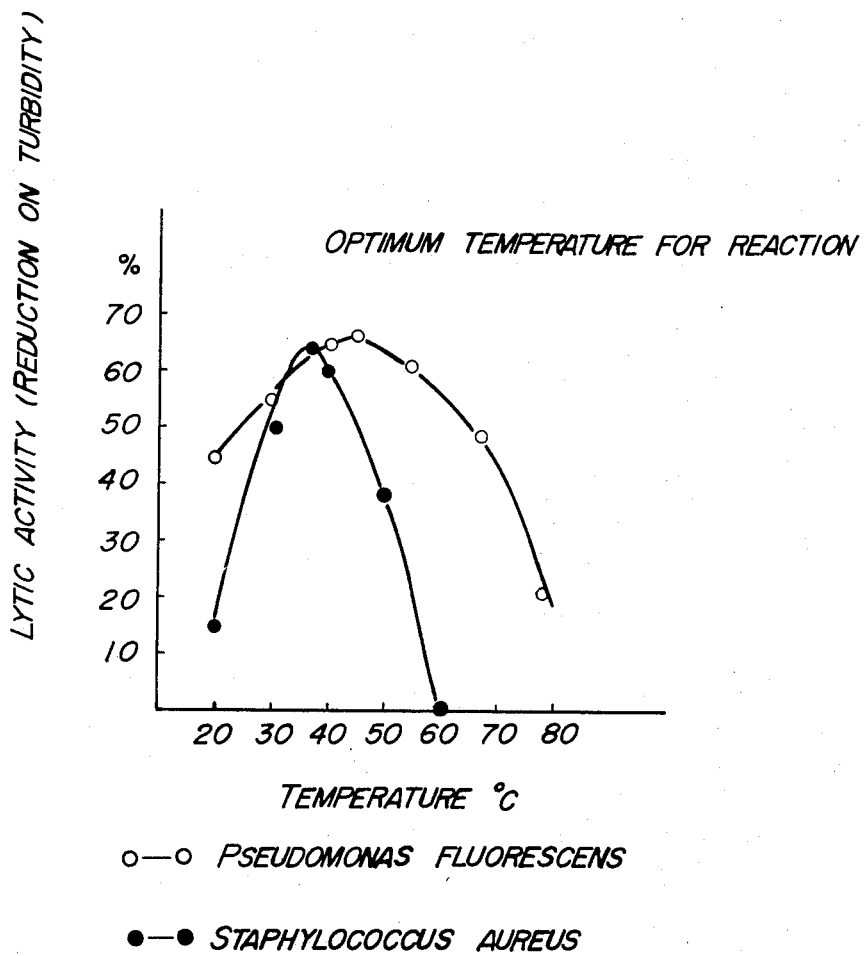

The optimum temperature of the present enzyme in the enzyme reaction is shown in FIG. 2, when the measurement was made with two strains, *Pseudomonas fluorescens* IAM 1179 and *Staphylococcus aureus* IAM 1058. The optimum temperature for *Pseudomonas fluo-*

*rescens* is about 40° to about 45° C, as shown in FIG. 2, where the reactions were carried out at temperature from 20° to 78° C. The optimum temperature for *Staphylococcus aureus* is about 38° C to about 40° C, and no reaction was observed at 60° C.

Figure 3:
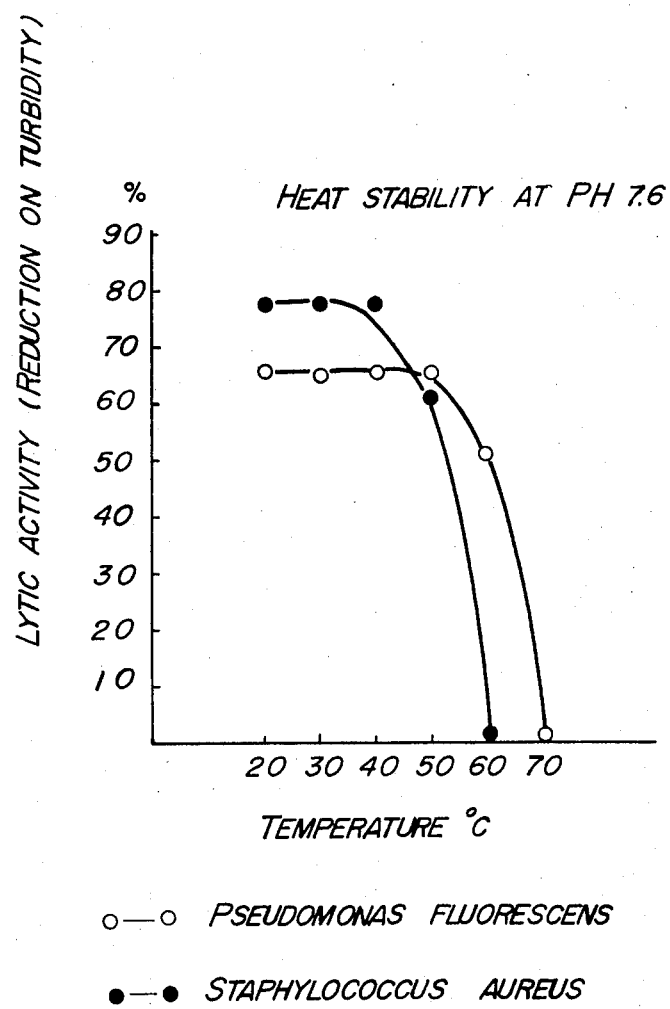

As to the heat stability of the present enzyme, the results at pH 7.6 are shown in FIG. 3. For *Pseudomonas fluorescens*, about 80 percent activity remains with heat treatment at 60° C for 30 minutes, but the activity towards *Staphylococcus aureus* is completely lost with the same heat treatment as above.

The effect of sodium chloride concentration upon the present enzyme reaction was measured, using *Pseudomonas fluorescens* IAM 1179 as a substrate and a 0.1 M tris buffer solution at pH 7.6. The results are shown in Table 2. When sodium chloride was added to the reaction solution at 5 percent sodium chloride concentration, the activity remained 67.1 percent, as compared with the control, and at the 10 percent sodium chloride concentration, the activity remained 45.8 percent.

Table 2

| Sodium chloride concentration of the reaction solution | Bacteriolytic activity (%) | Residual activity (%) |
| --- | --- | --- |
| 0 (control) | 75 | 100 |
| 5 | 50.3 | 67.1 |
| 10 | 34.4 | 45.8 |
| 18 | 23.5 | 31.3 |

Now, the present invention will be explained in detail, referring to Examples.

Example 1

A basal medium having the following composition was adjusted to pH 5.0, and 50 ml of the medium was poured each into 20 flasks having a capacity of 500 ml.

| | | | |
| --- | --- | --- | --- |
| Urea | 0.6 %, | Yeast extract | 0.1 % |
| KH$_2$PO$_4$ | 0.05 %, | Fe$^{++}$(FeSO$_4$) | 10 ppm |
| NaH$_2$PO$_4$ | 0.05 %, | Co$^{++}$(CoCl$_2$·6H$_2$O) | 10 ppm |
| MgSO$_4$ | 0.05 % | | |

After sterilization at 110° C for 12 minutes (pH being increased to 7.4 thereby), a normal paraffin mixture of $C_{12}-C_{18}$ was added thereto at a concentration of 2 percent. 5 percent of a seed culture broth obtained by cultivating *Pseudomonas aeruginosa* L-1028 (FERM-P 788, ATCC No. 21776) on the medium similar to the above medium in advance for 48 hours was inoculated each into the flasks, and cultivation was carried out at 30° C for 72 hours with shaking.

After the completion of cultivation, cells were removed from the culture broth by a centrifuge, and ammonium sulfate was added to the resulting supernatant solution up to 0.8 saturation, and the solution was left standing at −5° C overnight. Then, the salted-out protein was collected and dialyzed against cold water. The dialyzed solution was freeze-dried, whereby about 3.5 g of powders was obtained from 1 *l* of the culture broth. 100 mg of the crude enzyme powders thus obtained was dissolved in 100 ml of a 0.1 M tris buffer solution (pH 7.6) and used as an enzyme solution. Bacterial cellwall lytic activity of the enzyme solution is shown in Table 3.

TABLE 3

| Microorganisms tested | Bacteriolytic activity (%) | |
| --- | --- | --- |
| | after 1 hr. | after 4 hr. |
| *Pseudomonas fluorescens* IAM 1179 | 48.2 | 78.5 |
| *Pseudomonas aeruginosa* ATCC 14886 | 62.0 | 78.6 |
| *Micrococcus caseolyticus* IAM 1312 | 41.6 | 51.7 |
| *Micrococcus ureae* ATCC 14375 | 28.2 | 36.8 |
| *Staphylococcus aureus* IAM 1098 | 65.0 | 86.4 |

Example 2

A culture broth obtained by cultivating *Pseudomonas aeruginosa* L-1028 (FERM-P 788, ATCC No. 21776) for 98 hours in the same manner as in Example 1 was dialyzed against a well cooled 0.03 M buffer solution (pH 7.6) overnight, and three-fold volume of cold ethanol was added to the dialyzed solution. The resulting precipitate was centrifuged, collected and dried with cold acetone, whereby about 3 g of dry enzyme powders was obtained from 1 *l* of the supernatant solution.

100 mg of the powders was dissolved in 100 ml of a 0.1 M tris buffer solution (pH 7.6), and the resulting solution was used as an enzyme solution. Bacteriolytic effects of the enzyme solution upon the living cells and acetone-dried cells of *Pseudomonas fluorescens* IAM 1179, *Pseudomonas aeruginosa* ATCC 14886, and *Staphylococcus aureus* IAM 1098 were determined. The results are given in Table 4, which shows the remarkable bacteriolytic effect.

TABLE 4

| Microorganisms tested | Bacteriolytic activity (%) | |
| --- | --- | --- |
| | Living cells | Acetone-dried cells |
| *Pseudomonas fluorescens* IAM 1179 | 76.2 | 70.6 |
| *Pseudomonas aeruginosa* ATCC 14886 | 78.2 | 78.2 |
| *Staphylococcus aureus* IAM 1098 | 86.0 | 80.6 |

Example 3

A basal medium having the following composition was adjusted to pH 5.0, and 50 ml of the medium was poured each into 20 flasks having a capacity of 500 ml.

| | |
| --- | --- |
| Urea | 0.6 % |
| KH$_2$PO$_4$ | 0.05 % |
| Na$_2$HPO$_4$ | 0.05 % |
| MgSO$_4$ | 0.05 % |
| Yeast extract | 0.1 % |
| Fe$^{++}$(FeSO$_4$) | 10 ppm |
| Co$^{++}$(CoCl$_2$·6H$_2$O) | 10 ppm |

After sterilization at 110° C for 15 minutes (pH being increased to 7.6 thereby), ethanol was added to the flasks at 2 percent concentration, and 5 percent of a seed culture broth obtained by cultivating *Pseudomonas aeruginosa* L-1028 (FERM-P 788, ATCC No. 21776) for 48 hours in a medium similar to the above in advance was inoculated each into the flasks. Cultivation was carried out at 30° C for 72 hours with shaking. After the cultivation, cells were removed from the culture broth by a centrifuge, and ammonium sulfate was added to the supernatant solution to 0.8 saturation. The solution was left standing at −5° C overnight, and the salted-out protein was collected and dialyzed against cold water. The dialyzed solution was freeze-dried, whereby about 3.0 g of enzyme powders was obtained from 1 l of the culture broth. 100 mg of the crude enzyme powders was dissolved in 100 ml of a 0.1 M tris buffer solution (pH 7.6), and the resulting solution was used as an enzyme solution.

Bacterial cellwall lytic activity of the enzyme solution was determined. The result is given in Table 5.

TABLE 5

| Microorganisms tested | Bacteriolytic activity, % | |
|---|---|---|
| | After 1 hr. | After 4 hr. |
| Staphylococcus aureus IAM 1098 | 89.0 | 89.0 |
| Pseudomonas fluorescens IAM 1179 | 48.0 | 78.2 |
| Pseudomonas aeruginosa ATCC 14886 | 62.0 | 78.6 |
| Bacillus subtilis IAM 1069 | 12.0 | 51.2 |
| Micrococcus caseolyticus IAM 1312 | 40.1 | 51.7 |
| Micrococcus ureae ATCC 14375 | 12.6 | 37.6 |

Example 4

Sodium acetate was added to the same basal medium as in Example 1 at a 2 percent concentration, and after sterilization, the medium was adjusted to pH 7.0. Then, 100 ml of a seed culture broth obtained by cultivating Pseudomonas aeruginosa L-1028 (FERM-P 788, ATCC No. 21776) for 72 hours in a medium similar to the above in advance was inoculated in 2 l of the medium, and cultivation was carried out at 30° C for 96 hours with aeration-stirring. After the cultivation, cells were removed from the culture broth by a centrifuge, and 6 l of alcohol was added to the resulting supernatant solution. The solution was left standing overnight, and the precipitate was collected by a centrifuge, while discarding the supernatant solution. After sufficient cooling, the precipitate was dried with acetone, whereby about 2.5 g of the dry enzyme powders was obtained. 100 mg of the crude enzyme powders was dissolved in 100 ml of a 0.1 M tris buffer solution (pH 7.6), and the solution was used as an enzyme solution.

Bacterial cellwall lytic activity of the enzyme solution was determined. The result is given in Table 6.

TABLE 6

| Microorganisms tested | Bacteriolytic Activity, % | |
|---|---|---|
| | after 1 hr. | after 4 hr. |
| Staphylococcus aureus IAM 1098 | 72 | 86 |
| Pseudomonas fluorescens IAM 1179 | 38 | 65 |
| Pseudomonas aeruginosa ATCC 14886 | 32 | 60 |
| Pseudomonas tabaci ATCC 11527 | 20.2 | 40.2 |

What is claimed is:

1. A process for producing a bacterial cellwall lytic enzyme, which comprises cultivating a strain Pseudomonas aeruginosa L-1028, FERM-P 788, ATCC No. 21776 being capable of producing a bacteriolytic cellwall lytic enzyme from a non-carbohydrate carbon source in a medium containing at least one non-carbohydrate selected from the group consisting of hydrocarbons, alcohols, organic acids and ammonium and sodium salts of organic acids as a carbon source under aerobic conditions, forming and accumulating the enzyme in the medium, and recovering the bacterial cellwall lytic enzyme from the medium.

2. A bacterial cellwall lytic enzyme obtained by culturing a strain Pseudomonas aeruginosa L-1028, FERM-P 788, ATCC No. 21776 and having an ability to dissolve bacterial cellwalls; an optimum pH of 7.0 to 8.0, an optimum temperature of 37° to 40° C and a heat stability being lost at 60°C for 30 minutes for Staphylococcus aureas IAM 1098 gram-positive bacteria; and an optimum pH of 7.0 to 8.0, an optimum temperature of 40° to 45° C and a heat stability being kept 80 percent at 60° C for 30 minutes for Pseudomonas flurescens IAM 1179 gram negative bacteria; and a residual activity being 45.8 percent in a 10 percent sodium chloride solution.

3. A process according to claim 1, wherein said medium contains kerosene, gas oil, or liquid paraffin.

4. A process according to claim 1, wherein said medium contains n-paraffins of $C_{12} - C_{18}$.

5. A process according to claim 1, wherein said medium contains ethyl alcohol or methyl alcohol.

6. A process according to claim 1 wherein said medium contains acetic acid, succinic acid, or the ammonium or sodium salt of acetic acid or succinic acid.

7. A process according to claim 1, wherein the medium contains 1 - 5 percent (W/V) of the non-carbohydrate.

8. A process according to claim 1, wherein the cultivation is carried out at a pH of about 7, 20° - 40° C for 24 - 96 hours.

* * * * *